United States Patent Office 3,159,794
Patented Dec. 1, 1964

3,159,794
DEFLECTION VOLTAGE WAVEFORM GENERATOR EMPLOYING TRANSFORMER WITH ROTATABLE PRIMARY AND SECONDARY WINDINGS
Henry W. Appel, Eastchester, George W. King, Pleasantville, and Clayton A. Washburn, Thornwood, N.Y., assignors, by mesne assignments, to Smith Kline & French Laboratories, Philadelphia, Pa., a corporation of Pennsylvania
Filed Dec. 21, 1962, Ser. No. 246,621
5 Claims. (Cl. 328—185)

This invention relates generally to apparatus for generating voltage waveforms suitable for deflecting the beam of a cathode ray tube and particularly to apparatus for generating a sawtooth voltage waveform the slope of which varies with the angular position of a shaft.

The invention will be described in connection with apparatus which visually displays variations in the texture of relatively soft materials such as tissues of the human body. Such apparatus transmits ultrasonic pressure waves to the body to be explored and receives reflections caused by discontinuities in the body. These reflections are displayed on a cathode ray tube so as to show precisely where the discontinuities lie. Apparatus of this nature is very valuable in medical diagnosis and has been applied specifically to the study of growths and other diseases of the human eye.

The generation of suitable deflection voltages for the cathode ray tube presents serious problems for two reasons. First, the extremely high resolution required of the instrument requires correspondingly high linearity and accuracy of slope in the deflection voltages. Second, the transducer which transmits pulses of energy and receives the echoes is in continuous motion, necessitating a corresponding continuous change in the deflection voltages.

It is a general object of the present invention to provide apparatus for generating voltages suitable for application to the deflection circuits of a cathode ray tube.

Another object is to provide apparatus for generating sawtooth voltage waveforms the slopes of which vary in accordance with the angular position of a shaft.

Another object is to provide apparatus for generating a unidirectional voltage the polarity and amplitude of which are indicative of the sine of the angle by which a shaft is displaced from a reference position.

Briefly stated, in a specific embodiment of the invention, the shaft controlling the system is connected to a rotatable transformer such as an inductive resolver. The primary is excited by an alternating current source. The secondary is connected in series with a voltage from the source and the resultant rectified. The voltage from the source is separately rectified and subtracted from the above mentioned resultant. The unidirectional voltage thereby obtained controls a sawtooth generator such as a Miller integrator. The input and output of the sawtooth generator are normally clamped to ground but are unclamped periodically by suitable gates. Accordingly, during the gates, a sawtooth waveform is generated, the slope of which is determined by the angular position of the shaft. An additional secondary winding on the resolver can be connected in the same way to generate a deflection voltage for the other coordinate.

For a clearer understanding of the invention, reference may be made to the following detailed description and the accompanying drawing, in which.

Figure 1:
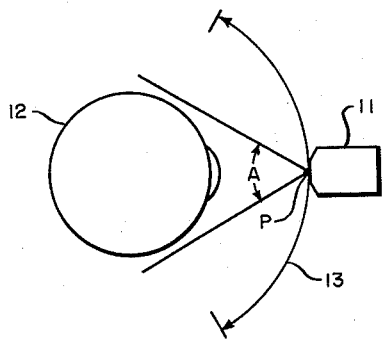
FIGURE 1 is a diagram showing the motion of an electro-acoustical transducer.

Referring first to FIGURE 1, there is shown an electro-acoustical transducer 11 which receives pulses of electrical energy and in response thereto transmits a very narrow beam of longitudinal pressure waves at a supersonic frequency. During the interval between pulses the transducer receives reflections caused by discontinuities in the path of the beam, which reflections are suitably displayed on a cathode ray tube. The transducer 11 is shown as transmitting pulses toward a human eye 12 for the purposes of examining its structure. The transducer is continuously oscillated, by means not here pertinent, about an axis through the point P perpendicular to the paper through an angle A which may be on the order of 60°. This oscillation is herein called sector scan. The transducer 11 is also continuously moved along an arc 13 which, in the present case, may be about 120° in length, although in other cases the arc may be a full 360°. This motion of the transducer is herein called arc scan. The combined, or compound, scan enables interior portions of the eye to be explored from various angles.

The present invention is directed to apparatus which generates deflection voltages for the cathode ray tube so that the reflections received by the transducer 11 may be displayed in the proper position on the face of the tube, regardless of the physical location and orientation of the transducer 11.

Figure 2:
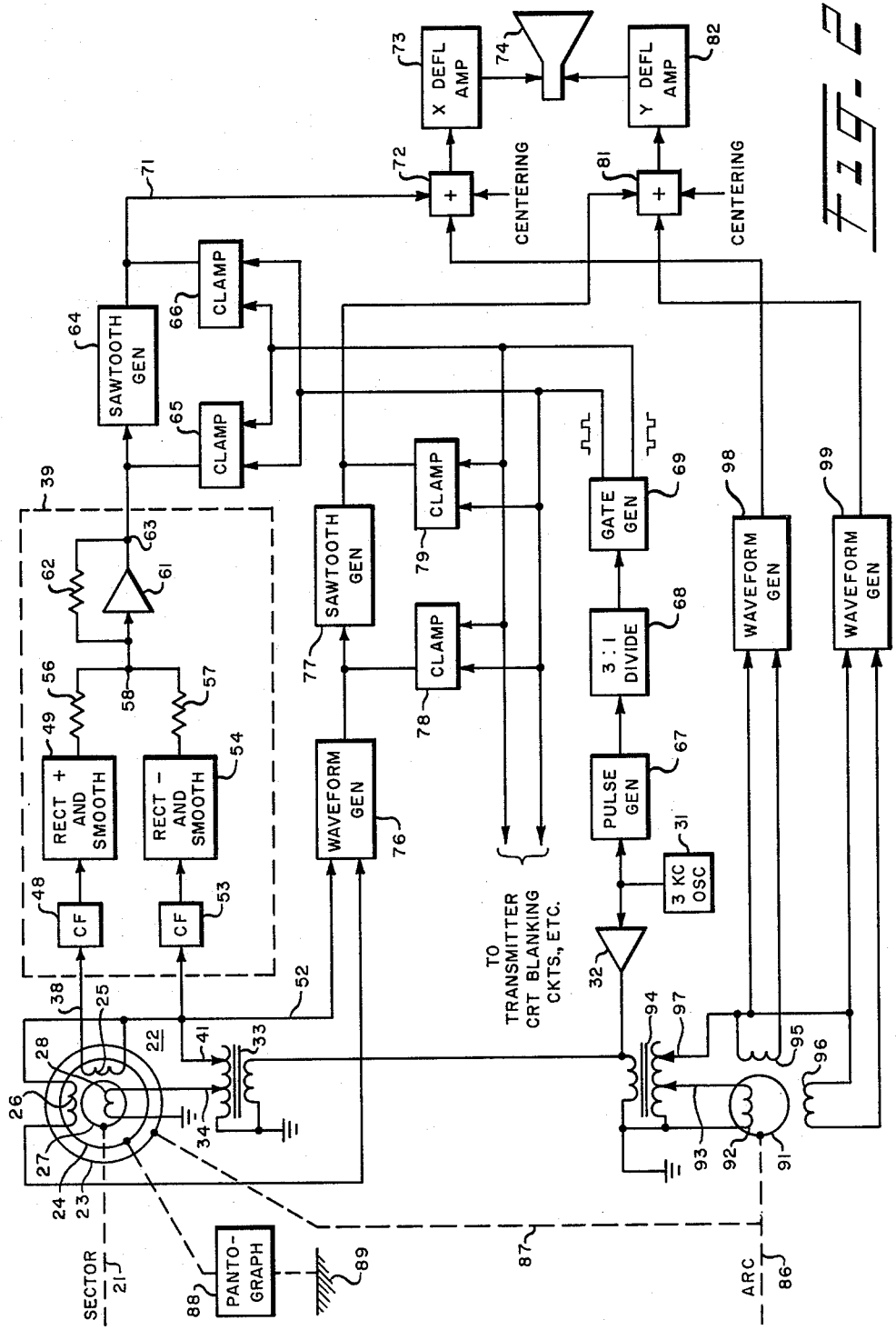
FIGURE 2 is a schematic block diagram of a preferred embodiment of the invention.

Referring now to FIGURE 2, there is shown schematically a shaft 21 which is assumed to be the axis through the point P about which the transducer 11 is oscillated to produce the sector scan. Also shown is a transformer having relatively rotatable primary and secondary winding denoted generally by the reference character 22. In the specific embodiment being described, the transformer 22 is a conventional inductive resolver comprising a case 23; a stator 24 rotatable in the case 23 and provided with two stator windings 25 and 26 positioned orthogonally with respect to each other; and a rotor 27, rotatable with respect to the stator 24 and provided with a single rotor winding 28. For the present, the relative rotation of the case and stator will be ignored and it will be assumed that both of these portions remain stationary while the rotor is mechanically connected to be rotated by the sector shaft 21.

Figure 3:
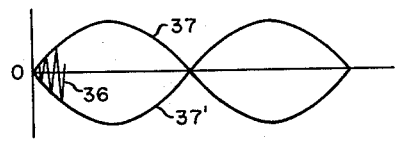
FIGURES 3 to 8, inclusive, are graphs useful in explaining the invention, and show the variations of various voltages as functions of the angular position of a shaft.

A source of alternating current such as a 3 kc. oscillator 31 is connected to the input of a power amplifier 32 which, in turn, is connected to the primary winding of a transformer 33. The secondary of this transformer is provided with an adjustable tap 34 from which the primary winding 28 is excited. Accordingly, the secondary winding 25 has induced therein a voltage having a frequency of 3 kc., the amplitude of which is determined by the angular position of the shaft 21. This voltage is depicted in FIGURE 3 wherein the curve 36 illustrates the fact that the voltage is actually a 3 kc. sine wave and the curves 37 and 37' illustrate the peak-to-peak amplitude of the voltage as a function of the angular position of the shaft 21. The phase of the 3 kc. wave, of course, reverses as the 180° position is passed.

Figure 4:
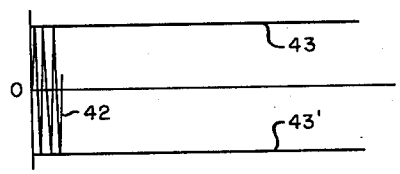
Figure 5:
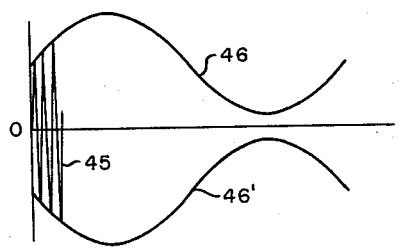

One terminal of the winding 25 is connected by means of a conductor 38 to a waveform generator shown generally by the dashed outline 39. The other terminal of the winding 25 is connected to a second adjustable tap 41 on the transformer 33. The voltage between the tap 41 and ground remains unaffected by the rotation of the shaft 21 and is selected to have an amplitude greater than the maximum amplitude of the voltage induced in the winding 25. The voltage of the tap 41, which may, for example, be 110% of the voltage induced in the winding 25, is shown in FIGURE 4 as comprising a 3 kc. alternating voltage 42. The envelope of this voltage is shown by the two straight lines 43 and 43'. This voltage is also applied to the waveform generator 39. It is apparent that the voltage of the conductor 38 with respect to ground is the sum of the voltage induced in the winding 25 and the voltage of the tap 41. This combined voltage is depicted in FIGURE 5 which shows the 3 kc. voltage 45 bounded by the double sinusoidal envelopes 46 and 46'. It is apparent that during one-half of the shaft rotation the two voltages are cumulative, while during the remaining half of the shaft rotation the voltages oppose each other.

Figure 6:
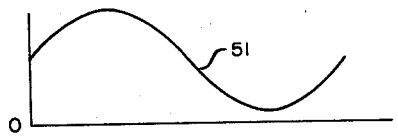
Figure 7:
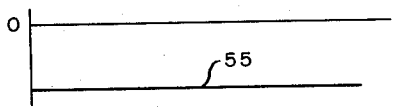
Figure 8:
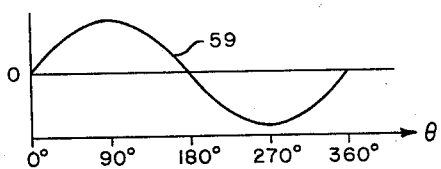

The conductor 38 is connected to a cathode follower circuit 48 which serves principally as an impedance transformation circuit. The output of the cathode follower is rectified and smoothed by a circuit 49, the output of which is a unidirectional voltage varying sinusoidally with the angular position of the shaft 21 and which always has the same polarity. This voltage is represented by the curve 51 of FIGURE 6. The tap 41 of the transformer 33 is connected by means of a conductor 52 to a cathode follower circuit 53 which in turn is connected to a rectifying and smoothing circuit 54. In the circuit 54 the rectifying device is poled oppositely to the circuit 49 so that the voltage output is constant but has a polarity opposite to that of the output of the circuit 49. This voltage is shown by the straight line 55 of FIGURE 7. The output voltage of the circuits 49 and 54 are added by means of summing resistors 56 and 57 so that the voltage at the summing point 58 is a sinusoidal voltage of reversible polarity as shown by the curve 59 of FIGURE 8. This voltage is positive when the shaft 21 is in the region between 0–180° from its reference position and is of negative polarity in the region from 180–360°. The amplitude is directly proportional to the sine of the angle through which the shaft 21 has been rotated. The voltage at the summing point 58 is utilized to determine the slope of a sawtooth voltage waveform. The point 58 is connected to a high-gain amplifier 61 having a negative feedback resistor 62 in order to make available an appreciable amount of power at low impedance. The output 63 of the amplifier 61 is applied to the input of a sawtooth waveform generator 64 which may, for example, be a Miller integrator. The generator 64 is maintained inactive by two clamping circuits 65 and 66 which normally maintain both the input and the output at ground potential. These clamps are also controlled by the oscillator 31 which is connected to a pulse generator 67 which generates one very short voltage pulse for each cycle of oscillation. The pulse generator 67 is connected to a dividing circuit 68 which generates one short voltage pulse for each three cycles of the generator 67. The dividing circuit 68, in turn, controls a gate generator 69 which generates one square voltage pulse for each applied pulse. The output pulses from the gate generator 69 may, for example, be of 150 μsec. duration and occur at the 1 kc. rate. The generator 67 preferably has a push-pull output so that pulses of both positive and negative polarity are generated simultaneously as shown in the drawing. The pulses are applied to the clamps 65 and 66 so that both the input and output of the generator 64 are maintained at ground potential during the interval between pulses but are unclamped during the 150 μsec. pulses. When one of these pulses, or gates, occurs the output of the generator 64 rises or falls linearly with respect to time, depending upon whether the output of amplifier 61 is positive or negative at this moment. Similarly, the rate of rise or fall depends on the amplitude of the output of the amplifier 61. Accordingly, there is generated during the pulse period on the conductor 71 a sawtooth voltage waveform, the slope of which is determined by the angular position of the shaft 21. The conductor 71 is connected to an adding circuit 72 which, in turn, is conected to the x-deflection amplifier 73 which generates a voltage suitable for application to a cathode ray tube 74.

The apparatus so far described generates the x-deflection voltage in accordance with the position of the sector shaft 21. The y-deflection voltage is generated with the aid of the winding 26 in the resolver 22. The voltage induced in the winding 26 likewise has added thereto the voltage of the conductor 52 and this combined voltage, as well as the voltage of conductor 52, is applied to waveform generator 76 which is in all respects identical to the generator 39 previously described. The output of the generator 76 is applied to a sawtooth generator 77, similar to the generator 64, which is also rendered normally inactive and periodically active by the voltage pulses from the gate generator 69 with the aid of clamping circuits 78 and 79. The output of the sawtooth generator 77 is connected through an adding circuit 81 to the y-deflection amplifier 82 which in turn is connected to the cathode ray tube 74.

In order to obtain deflection voltages suitable for the system shown schematically in FIGURE 1, it is necessary that the voltage from the sawtooth generators 64 and 77 be supplemented to take into consideration the fact that the transducer 11 is moving continuously along the arc 13 of FIGURE 1. This compensation could be accomplished in any of several ways, either electrically or mechanically or by a combination. In the particular apparatus being described, the transducer 11 of FIGURE 1 is mounted on a wheel or gear which rotates slowly. The shaft, or axis, which rotates this gear is shown schematically in FIGURE 2 by the dotted line 86. The case 23 of the resolver 22 is also mounted on the same wheel and, therefore, the entire resolver turns with the transducer along the arc 13 of FIGURE 1. This mounting arrangement is shown schematically in FIGURE 2 by a dotted line 87 which represents a mechanical connection between the arc shaft 86 and the case 23. Since the resolver as a whole rotates while the cathode ray tube 74 is stationary, it is necessary that this rotary motion be compensated for. This is accomplished by connecting the stator 24 to a mechanical pantograph, schematically shown at 88 in FIGURE 2, which in turn is connected to the frame 89 of the apparatus. The overall effect is that although the case 23 of the resolver rotates with the arc shaft 86, the stator 24 remains stationary with respect to the frame 89 of the apparatus. However, since the transducer views the object from different angles as it traverses the arc 13 of FIGURE 1, it is necessary to modify the deflection voltages applied to the cathode ray tube to move the origin of the previously generated sector scan along a path corresponding to the arc 13.

The arc shaft 86 is mechanically connected to turn the rotor of an inductive resolver 91, the case and stator of which are both fixed to the frame of the apparatus. The rotor winding 92 of the resolver 91 is connected to an adjustable tap 93 of a transformer 94, the primary winding of which is also excited by the voltage from the power amplifier 32. Each of the stator windings 95 and 96 has added thereto a voltage obtained from a tap 97 on the transformer 94 which voltage may again be about 110% of the maximum voltage induced in either of the windings 95 or 96. The combined voltages, along with a voltage obtained directly from the tap 97, are applied to waveform generators 98 and 99, each of which may be identical to the generator 39 previously described. The output voltages from the generators 98 and 99 are similar to the voltage 59 of FIGURE 8 and are applied to the adding circuits 72 and 81, respectively, thereby modifying the sawtooth voltage waveforms obtained from the generators 64 and 77. The overall effect is to shift the effective center of the sector scan as the transducer moves along the arc 13. Adjustable D.C. voltages are also applied to each of the adding circuits 72 and 81 in order to permit the display on cathode ray tube 74 to be adjusted upward and downward and from right to left in order to center the image.

The pulse output of the gate generator 69, in addition to controlling the clamping circuits previously described, also controls the timing of the entire system. For example, these pulses are used to control the generation of pulses applied to the transducer 11 and also control the blanking circuits of the cathode ray tube so as to eliminate retrace lines on the screen.

It is apparent that the present invention supplies deflection voltages for accurately displaying an image on the cathode ray tube, regardless of the position of the transducer during the compound scanning operation. One of the important features of the present invention is the arrangement for generating the unidirectional control voltage which appears at the summing point 58 and at the output of the amplifier 61. A high degree of accuracy in the generation of this voltage is obtainable because the only critical component is the resolver 22 and very accurate resolvers are readily obtainable.

Another noteworthy feature of the present apparatus is that the entire deflection system is controlled by the same alternating current source. This feature insures that the relative sizes of the various deflection voltage components remain constant despite variations in the source. Accordingly, although the scale factor of the entire display may change, the image remains undistorted.

Although a preferred embodiment has been described in considerable detail, many modifications can be made within the spirit of the invention. It is therefore desired that the protection afforded by Letters Patent be limited only by the true scope of the appended claims.

What is claimed is:

1. Apparatus for generating a unidirectional voltage the polarity and amplitude of which are indicative of the sine of the angle by which a shaft is displaced from a reference position, comprising,
   a transformer having relatively rotatable primary and secondary windings mechanically connected to be rotated by said shaft,
   a source of alternating current connected to said primary winding,
   whereby the amplitude of the alternating voltage induced in said secondary winding is a sinusoidal function of the angular position of said shaft,
   means for adding a voltage derived from said source to the voltage of said secondary winding to obtain a combined voltage,
   means for rectifying and smoothing said combined voltage,
   means for rectifying and smoothing said voltage derived from said source, and
   means for subtracting the rectified voltage from said source from the rectified combined voltage.

2. Apparatus for generating a unidirectional voltage the polarity and amplitude of which are indicative of the sine of the angle by which a shaft is displaced from a reference position, comprising,
   a transformer having relatively rotatable primary and secondary windings mechanically connected to be rotated by said shaft,
   a source of alternating current connected to said primary winding,
   whereby the amplitude of the alternating voltage induced in said secondary winding is a sinusoidal function of the angular position of said shaft,
   means for adding to said voltage induced in said secondary winding a voltage derived from said source the amplitude of which is greater than the maximum amplitude of said voltage induced in said secondary winding, whereby a combined voltage is produced,
   means for rectifying and smoothing said combined voltage to produce a first unidirectional voltage having a first predetermined polarity with respect to a reference,
   means for rectifying and smoothing said voltage derived from said source to produce a second unidirectional voltage having a polarity opposite to that of said first unidirectional voltage,
   and means for adding algebraically said first and second unidirectional voltages.

3. Apparatus for generating a sawtooth voltage waveform suitable for deflecting the beam of a cathode ray tube, the slope of which is determined by the angular position of a shaft, comprising,
   a transformer having relatively rotatable primary and secondary windings mechanically connected to be rotated by said shaft,
   a source of alternating current connected to said primary winding,
   whereby the voltage induced in said second winding varies in amplitude and phase in accordance with the angular position of said shaft,
   means controlled by said induced voltage and said source for generating a unidirectional voltage the amplitude and polarity of which are indicative of the amplitude and phase of said induced voltage,
   means for generating a sawtooth voltage waveform the slope of which is controlled by the polarity and amplitude of said unidirectional voltage, and
   means controlled by said source for starting and stopping the operation of said last named means.

4. Apparatus for generating a series of sawtooth voltage waveforms all having the same duration but the slope of each of which is determined by the angular position of a shaft, comprising,
   an inductive resolver having relatively rotatable primary and secondary windings,
   said resolver being mechanically connected for rotation by said shaft,
   a source of alternating current,
   means for deriving an exciting voltage proportional to that of said source,
   means for applying said exciting voltage to said primary winding,
   means for deriving an auxiliary voltage proportional to that of said source,
   means for adding the voltage induced in said secondary winding to said auxiliary voltage to obtain a combined voltage,
   means for rectifying said combined voltage to obtain a first unidirectional voltage having a first polarity,
   means for rectifying said auxiliary voltage to obtain a second unidirectional voltage having a polarity opposite to that of said first voltage,
   means for adding algebraically said first and second unidirectional voltages to obtain a resultant voltage,
   a sawtooth voltage waveform generator controlled by said resultant voltage, and
   means controlled by said source for rendering said sawtooth waveform generator alternately active and inactive.

5. Apparatus for generating a pair of deflection voltages for a cathode ray tube so as to produce a sector scan in synchronism with the rotation of a first shaft and in which the effective center of the sector scan is adjusted automatically in accordance with the angular position of a second shaft, comprising,
   means controlled by the angular position of said first shaft for generating first and second unidirectional voltages the polarity and amplitude of which are indicative of the sign and magnitude of the sine and cosine respectively of the angular position of said first shaft,
   first and second circuits for generating first and second sawtooth voltage waveforms the slopes of which are determined by the polarity and amplitude of said first and second unidirectional voltages respectively, means for rendering said circuits alternately active and inactive simultaneously,
means controlled by the angular position of said second shaft for generating third and fourth unidirectional voltages the polarity and amplitude of which are indicative of the sign and magnitude of the sine and cosine respectively of the angular position of said second shaft,
means for combining said first and third voltages, and
means for combining said second and fourth voltages.

References Cited in the file of this patent
UNITED STATES PATENTS

| | | |
|---|---|---|
| 2,858,981 | Goldman | Nov. 4, 1958 |
| 3,069,678 | Sweeney | Dec. 18, 1962 |